US012610376B2

(12) United States Patent
Shibaike et al.

(10) Patent No.: US 12,610,376 B2
(45) Date of Patent: Apr. 21, 2026

(54) TERMINAL, COMMUNICATION METHOD, BASE STATION, AND WIRELESS SYSTEM FOR SCHEDULING TRANSMISSION OF A PLURALITY OF CHANNELS

(71) Applicant: NTT DOCOMO, INC., Tokyo (JP)

(72) Inventors: Naoya Shibaike, Tokyo (JP); Hiroki Harada, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 301 days.

(21) Appl. No.: 18/551,712

(22) PCT Filed: Mar. 29, 2021

(86) PCT No.: PCT/JP2021/013424
§ 371 (c)(1),
(2) Date: Sep. 21, 2023

(87) PCT Pub. No.: WO2022/208635
PCT Pub. Date: Oct. 6, 2022

(65) Prior Publication Data
US 2024/0172249 A1     May 23, 2024

(51) Int. Cl.
*H04W 72/23*       (2023.01)
*H04W 72/0446*     (2023.01)
(Continued)

(52) U.S. Cl.
CPC ..... *H04W 72/232* (2023.01); *H04W 72/0446* (2013.01); *H04W 72/1268* (2013.01)

(58) Field of Classification Search
CPC ... H04W 80/02; H04W 72/231; H04W 72/23; H04W 72/0446; H04W 72/232;
(Continued)

(56) References Cited

U.S. PATENT DOCUMENTS

| | | | | |
|---|---|---|---|---|
| 2021/0168779 A1* | 6/2021 | Mondal | ................ | H04L 5/0053 |
| 2021/0377979 A1* | 12/2021 | Bhamri | ................ | H04L 5/0094 |
| 2024/0064736 A1* | 2/2024 | Lin | ................... | H04W 72/1268 |

OTHER PUBLICATIONS

Office Action issued in Japanese Patent Application No. 2023-509943, dated Dec. 3, 2024 (3 pages).
(Continued)

*Primary Examiner* — Wei Zhao
(74) *Attorney, Agent, or Firm* — Osha Bergman Watanabe & Burton LLP

(57)     ABSTRACT

A terminal includes: a reception unit configured to receive DCI (Downlink Control Information) including an index indicating a row in a TDRA (Time Domain Resource Allocation) table and an upper layer parameter from a base station; a control unit configured to determine positions of one or a plurality of PUSCHs (Physical Uplink Shared Channel) scheduled in a time domain, based on the index and the upper layer parameter; and a transmission unit configured to transmit the one or the plurality of PUSCHs to the base station. In a case where the upper layer parameter is configured to be enabled and the index indicates scheduling of a single PUSCH in the TDRA, the control unit determines that the single PUSCH is to be repeatedly transmitted.

5 Claims, 9 Drawing Sheets

(51) Int. Cl.
 *H04W 72/1268* (2023.01)
 *H04W 72/232* (2023.01)
(58) Field of Classification Search
 CPC .. H04W 72/1263; H04L 1/1812; H04L 5/005;
 H04L 5/004
 See application file for complete search history.

(56) References Cited

OTHER PUBLICATIONS

3GPP TSG RAN WG1 #97; R1-1907029; Panasonic; "On PUSCH enhancements for NR URLLC"; Reno, USA; May 13-17, 2019 (10 pages).
3GPP TSG RAN WG1#99; R1-1912014; vivo; "Discussion on HARQ operation for NR-U"; Reno, USA; Nov. 18-22, 2019 (14 pages).
3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).
3GPP TS 38.306 V16.3.0; "3rd Generation Partnership Project; Technical Specification Group Radio Access Network; NR; User Equipment (UE) radio access capabilities (Release 16)"; Dec. 2020 (135 pages).
International Search Report issued in PCT/JP2021/013424 on Oct. 26, 2021 (3 pages).
Written Opinion of the International Searching Authority issued in PCT/JP2021/013424 on Oct. 26, 2021 (3 pages).

* cited by examiner

| K2 | Mapping type | SLIV |
|---|---|---|
| ...... | ...... | ...... |
| ...... | ...... | ...... |
| ...... | ...... | ...... |

START

S11

RECEIVE DCI

S12

REPEATEDLY TRANSMIT PUSCH BASED ON DCI

END

| K2 | Mapping type #1 | SLIV #1 | ⋯⋯ | Mapping type #N | SLIV #N |
|---|---|---|---|---|---|
| ⋯⋯ | ⋯⋯ | ⋯⋯ | ⋯⋯ | ⋯⋯ | ⋯⋯ |
| ⋯⋯ | ⋯⋯ | ⋯⋯ | ⋯⋯ | ⋯⋯ | ⋯⋯ |
| ⋯⋯ | ⋯⋯ | ⋯⋯ | ⋯⋯ | ⋯⋯ | ⋯⋯ |

FIG.7

START

S21

RECEIVE DCI

S22

TRANSMIT A PLURALITY OF PUSCHS BASED ON DCI

END

FIG.8

| K2 | Mapping type #1 | SLIV #1 | ...... | Mapping type #N | SLIV #N | K |
|---|---|---|---|---|---|---|
| ...... | ...... | ...... | ...... | ...... | ...... | ...... |
| ...... | ...... | ...... | ...... | ...... | ...... | ...... |
| ...... | ...... | ...... | ...... | ...... | ...... | ...... |

START

S31

RECEIVE DCI

S32

TRANSMIT A PLURALITY OF PUSCHS OR
REPEATEDLY TRANSMIT A SINGLE PUSCH, BASED ON DCI

END

TERMINAL, COMMUNICATION METHOD, BASE STATION, AND WIRELESS SYSTEM FOR SCHEDULING TRANSMISSION OF A PLURALITY OF CHANNELS

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

NR release 17 discusses using a higher frequency band than a conventional release (e.g., Non-Patent Document 2). For example, applicable numerologies including subcarrier spacings, channel bandwidths, etc., physical layer design, and possible failures in actual wireless communication in the 52.6 GHz to 71 GHz frequency band have been discussed.

CITATION LIST

Non-Patent Document

[Non-Patent Document 1] 3GPP TS 38.300 V16.4.0 (2020-12)

[Non-Patent Document 2] 3GPP TS 38.306 V16.3.0 (2020-12)

SUMMARY OF THE INVENTION

Technical Problem

In order to reduce the load required for monitoring PDCCH (Physical Downlink Control Channel) in a frequency band to be newly deployed in which frequencies higher than the conventional frequency are used, increasing the monitoring period is being discussed. On the other hand, in order to ensure the scheduling flexibility even in a case where the PDCCH monitoring period is increased, supporting the scheduling of a plurality of PDSCHs (Physical Downlink Shared Channels) or a plurality of PUSCHs (Physical Uplink Shared Channels) via single DCI (Downlink Control Information) is being discussed.

In addition, while repeated transmissions of a single PUSCH is supported, repeated transmissions of a plurality of PUSCHs scheduled by single DCI is currently not supported. Here, a method is required in which the scheduling of a plurality of PUSCHs via single DCI and the scheduling of repeated transmissions of a single PUSCH are both supported.

The present invention has been made in view of the foregoing points and enables to schedule both transmission of a plurality of channels and repeated transmissions of a single channel in a wireless communication system.

Solution to Problem

According to the disclosed technique, a terminal is provided. The terminal includes: a reception unit configured to receive DCI (Downlink Control Information) including an index indicating a row in a TDRA (Time Domain Resource Allocation) table and an upper layer parameter from a base station; a control unit configured to determine positions of one or a plurality of PUSCHs (Physical Uplink Shared Channel) scheduled in a time domain, based on the index and the upper layer parameter; and a transmission unit configured to transmit the one or the plurality of PUSCHs to the base station. In a case where the upper layer parameter is configured to be enabled and the index indicates scheduling of a single PUSCH in the TDRA, the control unit determines that the single PUSCH is to be repeatedly transmitted.

Advantageous Effects of Invention

According to the disclosed technique, scheduling of transmission of a plurality of channels and repeated transmissions of a single channel can be both performed in a wireless communication system.

BRIEF DESCRIPTION OF THE DRAWINGS

FIG. 1 is a drawing illustrating a configuration example of a wireless communication system according to an embodiment of the present invention.

FIG. 3 is a drawing illustrating an example (1) of a TDRA table.

FIG. 7 is a flowchart illustrating an example (2) of scheduling.

FIG. 8 is a drawing illustrating an example of a TDRA table in an embodiment of the present invention.

DETAILED DESCRIPTION OF THE PREFERRED EMBODIMENTS

Figure 2:
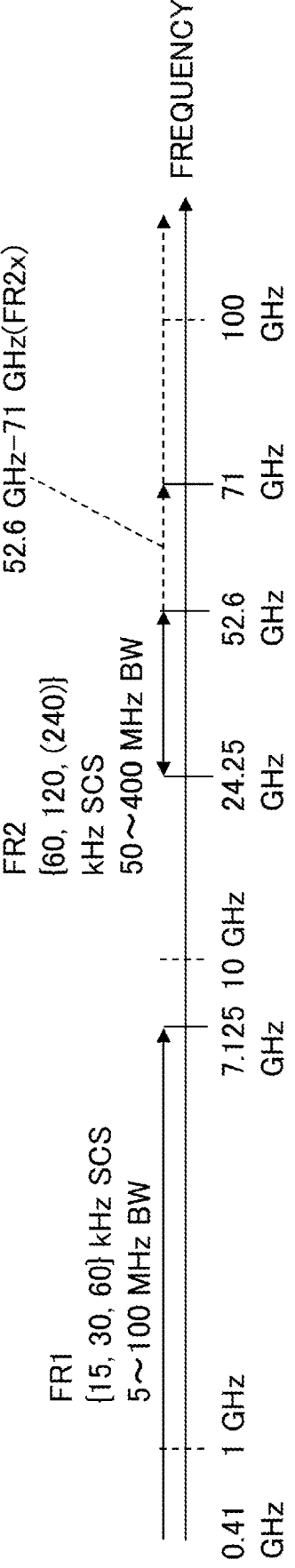
FIG. 2 is a drawing illustrating an example of a frequency range according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

Figure 1:
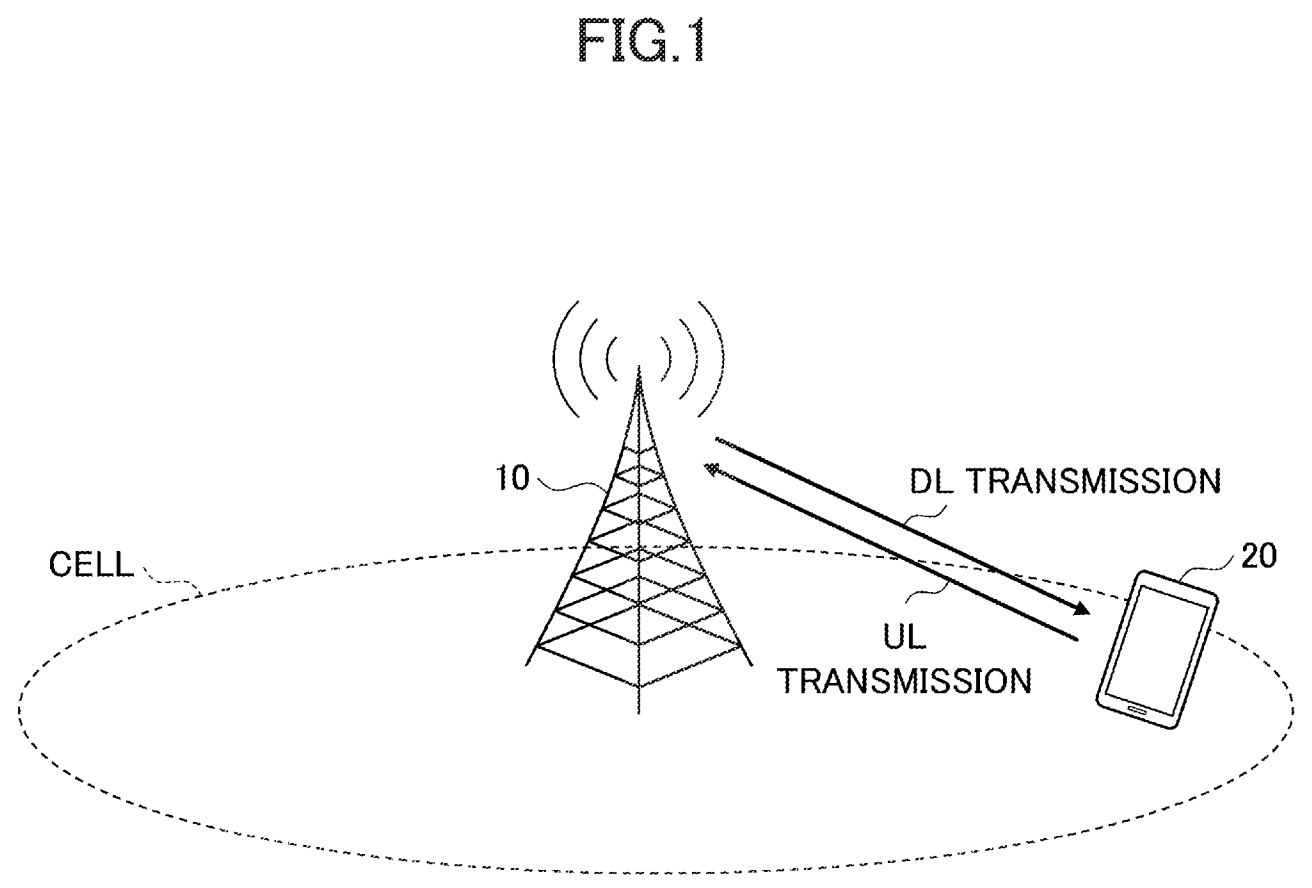

FIG. 1 is a drawing illustrating a configuration example of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (SCell: Secondary Cell) and a primary cell (PCell: Primary Cell) using CA (Carrier Aggregation). In addition, the terminal 20 may perform communications via a primary cell of the base station 10 and a primary secondary cell group cell (PSCell: Primary SCG Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals.

FIG. 2 is a drawing illustrating an example of a frequency range according to an embodiment of the present invention. In the NR specifications of 3GPP Release 15 and Release 16, for example, an operation in a frequency band of 52.6 GHz or more has been discussed. Note that, as shown in FIG. 2, FR (Frequency range) 1 in which current operation is defined is a frequency band from 410 MHz to 7.125 GHz, SCS (Sub carrier spacing) is 15, 30 or 60 kHz, and bandwidth is from 5 MHz to 100 MHz. FR2 is a frequency band from 24.25 GHz to 52.6 GHz, SCS is 60, 120 or 240 kHz, and bandwidth is from 50 MHz to 400 MHz. For example, the newly operated frequency band may be assumed to be from 52.6 GHz to 71 GHz. Furthermore, a frequency band beyond 71 GHz may be assumed to be supported.

In order to reduce the load required for monitoring PDCCH (Physical Downlink Control Channel) in a frequency band to be newly deployed in which frequencies higher than the conventional frequency are used, increasing the monitoring period is being discussed. On the other hand, in order to ensure the scheduling flexibility even in a case where the PDCCH monitoring period is increased, supporting the scheduling of a plurality of PDSCHs (Physical Downlink Shared Channels) or a plurality of PUSCHs (Physical Uplink Shared Channels) via single DCI (Downlink Control Information) is being discussed.

FIG. 3 is a drawing illustrating an example (1) of a TDRA table. As illustrated in FIG. 3, in a conventional TDRA (Time domain resource allocation) table used for scheduling a PUSCH, a K2 value, a mapping type, and an SLIV (Start and Length Indicator) are defined with respect to one row index. In general, the scheduling is performed by indicating a row index in the TDRA table to the terminal 20 via DCI. The K2 value indicates an offset from the scheduling DCI to the scheduled PUSCH.

The mapping type is a type of a method for specifying the symbol start position in the slot and the symbol length, and the type A and the type B are defined. With the type A, for example, the symbol start position of the PUSCH may be specified as the first symbol in a slot, and the symbol length of the PUSCH may be specified as four (4) symbols to fourteen (14) symbols. In other words, SLIVs corresponding to S=0 and L={4, . . . , 14} may be configured. With the type B, for example, the symbol start position of the PUSCH may be specified as a symbol from the first symbol to the thirteenth symbol, and the symbol length of the PUSCH may be specified as one (1) symbol to fourteen (14) symbols. In other words, SLIVs corresponding to S={0, . . . , 13} and L={1, . . . , 14} may be configured. Note that the scheduling crossing the slot boundary is not required to be supported.

Figure 4:
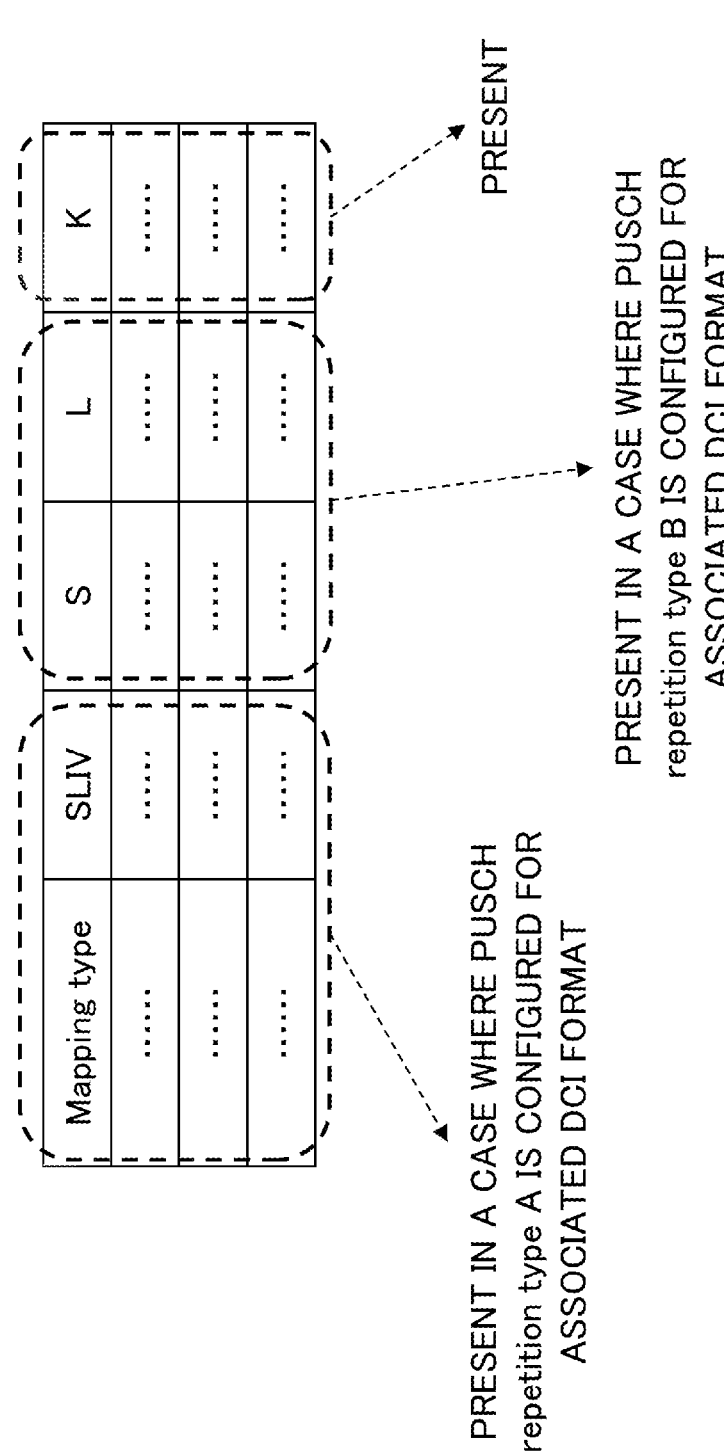
FIG. 4 is a drawing illustrating an example (2) of a TDRA table.

FIG. 4 is a drawing illustrating an example (2) of a TDRA table. Scheduling of PUSCH repetition is supported by the TDRA table illustrated in FIG. 4. For example, DG (Dynamic Grant)—PUSCH repetition may be scheduled by DCI format 0_1 or 0_2 that uses the TDRA table.

As a type of PUSCH repetition, the PUSCH repetition type A and the PUSCH repetition type B are supported. As illustrated in FIG. 4, in a case of the PUSCH repetition type A, the mapping type, SLIV and K may be specified, and in a case of the PUSCH repetition type B, S, L, and K may be specified. Note that the K indicates the number of repetitions. Note that the PUSCH repetition type A may be configured for the PUSCH mapping type A or for the PUSCH mapping type B. The PUSCH repetition type B may be configured only for the PUSCH mapping type B.

In a case where DG-PUSCH is scheduled by DCI format 0_1, the PUSCH repetition type is determined by an upper layer parameter, pusch-RepTypeIndicatorDCI-0-2. In a case where DG-PUSCH is scheduled by DCI format 0_2, the PUSCH repetition type is determined by an upper layer parameter, pusch-RepTypeIndicatorDCI-0-2.

In a case where DG-PUSCH is scheduled by DCI format 0_1 and in a case where type 2 CG (Configured Grant)—PUSCH is scheduled by DCI format 0_1, the TDRA table is determined based on an upper layer parameter, pusch-TimeDomainAllocationListDCI-0-1 if configured. In a case where the parameter is not configured, the TDRA table is determined based on a parameter, pusch-TimeDomainAllocationList included in the upper layer parameter, pusch-Config, if pusch-TimeDomainAllocationList is configured. In a case where the parameter is not configured, the TDRA table is determined based on a parameter, pusch-TimeDomainAllocationList included in the upper layer parameter, pusch-Config Common.

In a case where DG-PUSCH is scheduled by DCI format 0_2 and in a case where type 2 CG—PUSCH is scheduled by DCI format 01, the TDRA table is determined based on an upper layer parameter, pusch-TimeDomainAllocationListDCI-0-2 if configured. In a case where the parameter is not configured, the TDRA table is determined based on a parameter, pusch-TimeDomainAllocationList included in the upper layer parameter, pusch-Config, if pusch-TimeDomainAllocationList is configured. In a case where the parameter is not configured, the TDRA table is determined based on a parameter, pusch-TimeDomainAllocationList included in the upper layer parameter, pusch-ConfigCommon.

Note that the TDRA table that is enhanced for URLLC illustrated in FIG. 4 may be applied to the PUSCH repetition type B.

The number of repetitions, K, in the PUSCH repetition type B is determined by numberOfRepetitions in the TDRA table. The number of repetitions, K, in the PUSCH repetition type A is determined by numberOfRepetitions in the TDRA table, if present. In a case where numberOfRepetitions is not configured in the TDRA table, the number of repetitions, K, is configured by pusch-AggregationFactor, if configured. In a case where pusch-AggregationFactor is not configured, K=1.

Figures 5, 6:
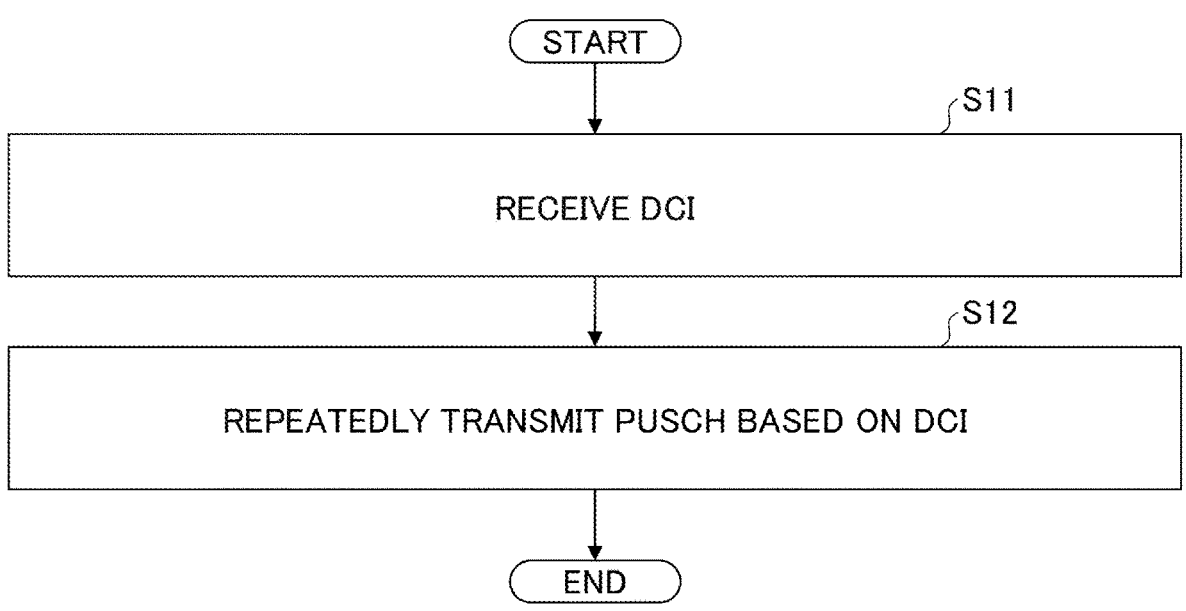
FIG. 5 is a flowchart illustrating an example (1) of scheduling.
FIG. 6 is a drawing illustrating an example (3) of a TDRA table.

FIG. 5 is a flowchart illustrating an example (1) of scheduling. In step S11, the terminal 20 receives DCI from the base station 10. In subsequent step S12, the terminal 20 repeatedly transmits PUSCH to the base station 10, based on the DCI. The DCI may be the above-described DCI format 0_1 or may be the above-described DCI format 0_2. In addition, the configuration by the above-described upper layer parameters may be applied to the repeated transmission of PUSCH.

FIG. 6 is a drawing illustrating an example (3) of a TDRA table. A plurality of PUSCHs may be scheduled by a single DCI format 0_1 according to the TDRA table illustrated in FIG. 6. As illustrated in FIG. 6, N SLIVs can be specified by one row index. The TDRA table is determined by pusch-TimeDomainAllocationList-ForMultiPUSCH. Multiple SLIVs from one (1) SLIV to eight (8) SLIVs may be configured with respect to one row index in the TDRA table according to the parameter.

Figure 7:
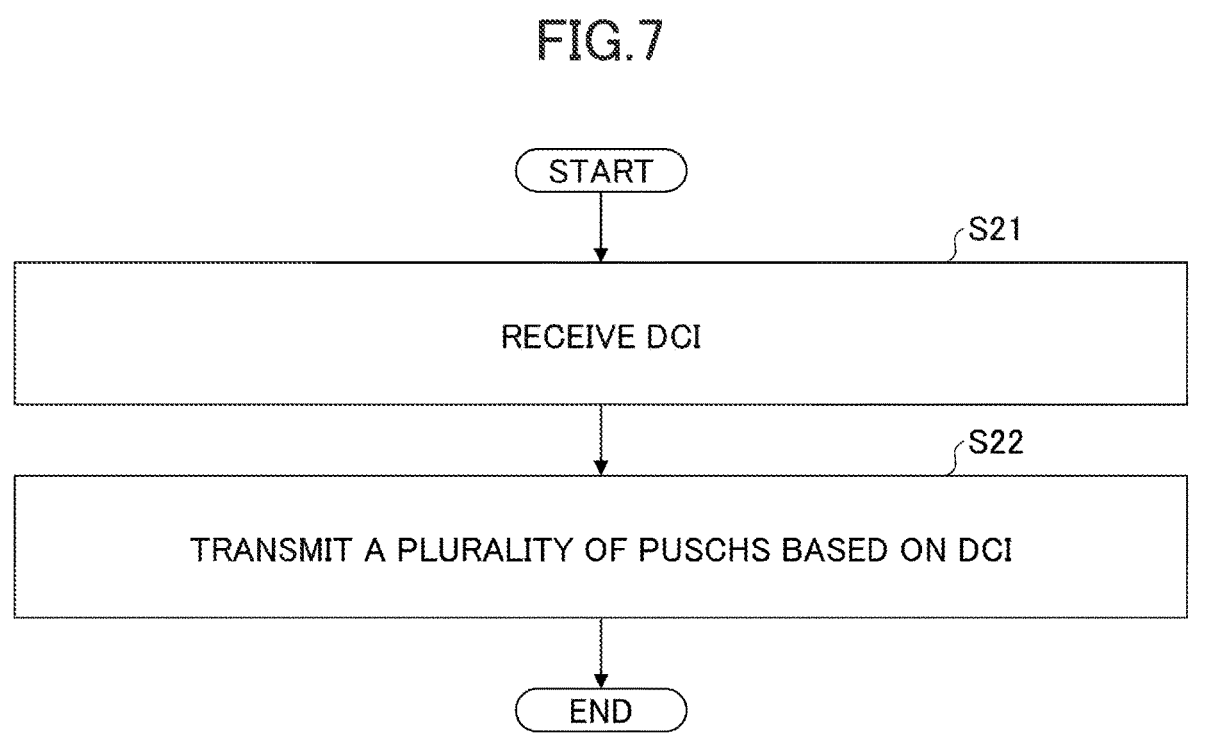

FIG. 7 is a flowchart illustrating an example (2) of scheduling. In step S21, the terminal 20 receives DCI from the base station 10. In subsequent step S22, the terminal 20 transmits a plurality of PUSCHs to the base station 10, based on the DCI. The DCI may be the above-described DCI format 0_1.

In a case where multiple PUSCHs are scheduled by single DCI, repeated transmission of PUSCH need not be supported. On the other hand, in a case where a single PUSCH is scheduled, repeated transmission of PUSCH may be supported.

Here, in a case where a TDRA table that is different from the Rel-16 URLLC table is used for scheduling of multiple PUSCHs in Rel-17 NR 52.6-71 GHz band, how to support both scheduling of multiple PUSCHs and repeated transmission of a single PUSCH is required to be discussed.

Therefore, as an option, whether the DCI format supporting the scheduling of multiple PUSCHs can be used for repeated transmission of a single PUSCH may be configured by a new RRC parameter. For example, the RRC parameter may be Multi-PUSCH-And-Single-PUSCH-Repetition. Methods of A), B), and C) as described below may be performed.

A) One DCI format may be associated with only one TDRA table. FIG. 8 is a drawing illustrating an example of a TDRA table in an embodiment of the present invention. The new TDRA table illustrated in FIG. 8 may be configured in which a TDRA table for scheduling of multiple PUSCHs is integrated with a TDRA table for scheduling of a single PUSCH. In other words, the number of repeated transmissions, K, may be included in the TDRA table illustrated in FIG. 6. For example, when the TDRA table illustrated in FIG. 8 is used, in a case where multiples PUSCHs are scheduled, K may be K=1, or K may be ignored.

In addition, in a case where the RRC parameter, Multi-PUSCH-And-Single-PUSCH-Repetition is enabled, the K may be used as the number of repeated transmissions of a single PUSCH only in a case where only one SLIV is configured with respect to a row index. On the other hand, in a case where the RRC parameter, Multi-PUSCH-And-Single-PUSCH-Repetition is disabled, repeated transmissions of PUSCH are not required to be performed even in a case where only one SLIV is configured with respect to a row index.

According to the new TDRA table that is defined as described above, the PUSCH repetition type A and the PUSCH repetition type B can be available for the scheduling of a single PUSCH by a single DCI format. In addition, the number of repeated transmissions of a single PUSCH can be flexibly indicated.

B) The TDRA table that is illustrated in FIG. 6 may be used for repeated transmissions of a single PUSCH. For example, in a case where the RRC parameter, Multi-PUSCH-And-Single-PUSCH-Repetition is enabled and where the RRC parameter, pusch-AggregationFactor is configured, pusch-AggregationFactor may be used as the number of repeated transmissions of a single PUSCH only if one SLIV is configured with respect to a row index. On the other hand, in a case where the RRC parameter, Multi-PUSCH-And-Single-PUSCH-Repetition is disabled or the RRC parameter, pusch-AggregationFactor is not configured, repeated transmissions of PUSCH are not required to be performed even if only one SLIV is configured with respect to a row index.

The repeated transmissions of PUSCH can be scheduled with no impact on the TDRA table specification by reusing the conventional TDRA table as described above.

C) In a case where the RRC parameter, Multi-PUSCH-And-Single-PUSCH-Repetition is enabled, two TDRA tables may be configured for one DCI format. The two TDRA tables correspond to scheduling of transmission of multiple PUSCHs and to scheduling of repeated transmissions of a single PUSCH, respectively. For example, the TDRA table illustrated in FIG. 6 may be used for scheduling of transmission of multiple PUSCHs, and the TDRA table illustrated in FIG. 4 may be used for scheduling of repeated transmissions of a single PUSCH. In a case where the RRC parameter, Multi-PUSCH-And-Single-PUSCH-Repetition is disabled, only one TDRA table may be configured for the DCI format.

In a case where two TDRA tables are configured for the DCI format, when a single PUSCH is scheduled, whether repeated transmissions are to be applied may be determined depending on which TDRA table is used and indicated. Which TDRA table has been used may be explicitly indicated by a field included in the DCI format. In a case where the TDRA table that has been used is a TDRA table corresponding to scheduling of multiple PUSCHs, repeated transmissions of PUSCH are not performed regardless of whether one or multiple SLIVs are indicated by the TDRA row index. On the other hand, in a case where the TDRA table that has been used is a TDRA table corresponding to scheduling of a single PUSCH, a rule of repeated transmissions of PUSCH that is the same as the conventional rule may be applied.

By configuring two TDRA tables for one DCI format as described above, the PUSCH repetition type A and the PUSCH repetition type B are supported for a single PUSCH scheduled by the DCI format. In addition, a single PUSCH with repetition or without repetition can be flexibly scheduled.

In addition, as another option, the DCI format that supports scheduling of transmission of multiple PUSCHs is not required to be used for scheduling of repeated transmissions of a single PUSCH. The scheduling of transmission of multiple PUSCHs and the scheduling of repeated transmissions of a single PUSCH may be performed by respective specific DCI formats according to the RRC configuration.

For example, the scheduling of transmission of multiple PUSCHs may be configured by DCI format 0_1 and the scheduling of repeated transmissions of a single PUSCH may be configured by DCI format 0_2. In addition, for example, the scheduling of transmission of multiple PUSCHs may be configured by DCI format 0_2 and the scheduling of repeated transmissions of a single PUSCH may be configured by DCI format 0_1.

In addition, the TDRA table for scheduling transmission of multiple PUSCHs illustrated in FIG. 6 may be used for PUSCH scheduling that is scheduled by DCI format 0_1 (or DCI format 0_2). Parameters associated with the PUSCH repetition type is not necessarily configured by the DCI format. In a case where multiple SLIVs are indicated by a TDRA row index, multiple PUSCHs may be transmitted without repetition. In addition, in a case where one SLIV is indicated by a TDRA row index, one PUSCH may be transmitted without repetition.

In addition, for example, the TDRA table for scheduling transmission of a single PUSCH illustrated in FIG. 3 or FIG. 4 may be used for PUSCH scheduling that is scheduled by DCI format 02 (or DCI format 0_1). Repeated transmissions of PUSCH may be performed in a manner similar to the conventional manner.

The impact on the technical specifications can be minimized by performing the scheduling of transmission of multiple PUSCHs and the scheduling of repeated transmissions of a single PUSCH by respective DCI formats according to the RRC configuration.

Figures 9, 10:
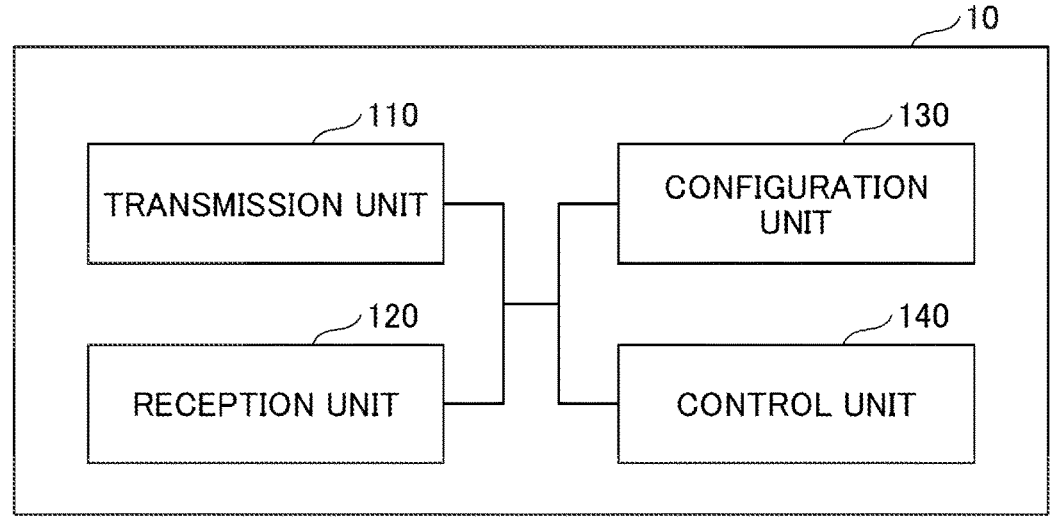
FIG. 9 is a flowchart illustrating an example of scheduling in an embodiment of the present invention.
FIG. 10 is a drawing illustrating an example of a functional structure of a base station 10 in an embodiment of the present invention.

FIG. 9 is a flowchart illustrating an example of scheduling in an embodiment of the present invention. In step S31, the terminal 20 receives DCI from the base station 10. In subsequent step S32, the terminal 20 transmits multiple PUSCHs or repeatedly transmits a single PUSCH, based on the DCI. Note that the terminal 20 may transmit the single PUSCH without repetition.

Any one of the options in the above embodiments may be applied to a predetermined frequency band, for example, NR 52.6-71 GHz. In addition, any one of options in the above embodiments may be applied to a predetermined SCS, for example, 120 kHz and/or 480 kHz and/or 960 kHz. In addition, which of options in the above embodiments is to be used may be configured by an upper layer parameter, may be reported by the terminal 20 as UE capability, may be defined in the technical specifications, or may be determined based on the upper layer parameter and the UE capability.

A UE capability may be defined which indicates whether the terminal supports scheduling of transmission of multiple PUSCHs and scheduling of repeated transmissions of a single PUSCH. In addition, a UE capability may be defined which indicates whether the terminal 20 simultaneously supports, by using a single DCI format, scheduling of transmission of multiple PUSCHs and scheduling of repeated transmissions of a single PUSCH. For example, the single DCI format may be DCI 50 format 0_1 and/or DCI format 0_2. In addition, a UE capability may be defined which indicates whether the terminal 20 supports, by using respective DCI formats, scheduling of transmission of multiple PUSCHs and scheduling of repeated transmissions of a single PUSCH.

According to an embodiment described above, the base station 10 can efficiently schedule transmission of multiple PUSCHs and repeated transmissions of a single PUSCH for the terminal 20.

That is, scheduling of transmission of multiple channels and repeated transmissions of a single channel can be both performed in a wireless communication system.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

FIG. 10 is a drawing illustrating an example of a functional structure of a base station 10 according to an embodiment of the present invention. As shown in FIG. 10, the base station 10 includes a transmission unit 110, a reception unit 120, a configuration unit 130, and a control unit 140. The functional structure illustrated in FIG. 10 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to measurement configuration.

The control unit 140 performs control related to measurement configuration as described in the embodiments. In addition, the control unit 140 performs scheduling. The functional units related to signal transmission in the control unit 140 may be included in the transmission unit 110, and the functional units related to signal reception in the control unit 140 may be included in the reception unit 120.

<Terminal 20>

Figure 11:
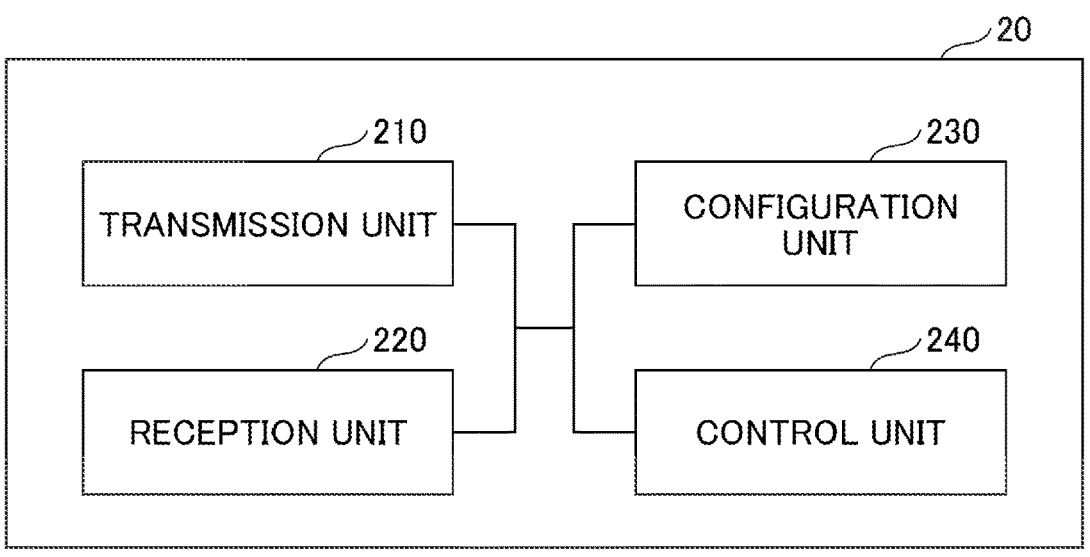
FIG. 11 is a drawing illustrating an example of a functional structure of a terminal 20 in an embodiment of the present invention.

FIG. 11 is a drawing illustrating an example of a functional structure of a terminal 20 according to an embodiment of the present invention. As shown in FIG. 11, the terminal 20 includes a transmission unit 210, a reception unit 220, a configuration unit 230, and a control unit 240. The functional structure illustrated in FIG. 11 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information items received by the reception unit 220 from the base station 10. In addition, the configuration unit 230 also stores pre-configured configuration information. Contents of the configuration information are, for example, information related to measurement configuration.

The control unit 240 performs control related to measurement configuration as described in the embodiments. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 10 and FIG. 11), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 12:
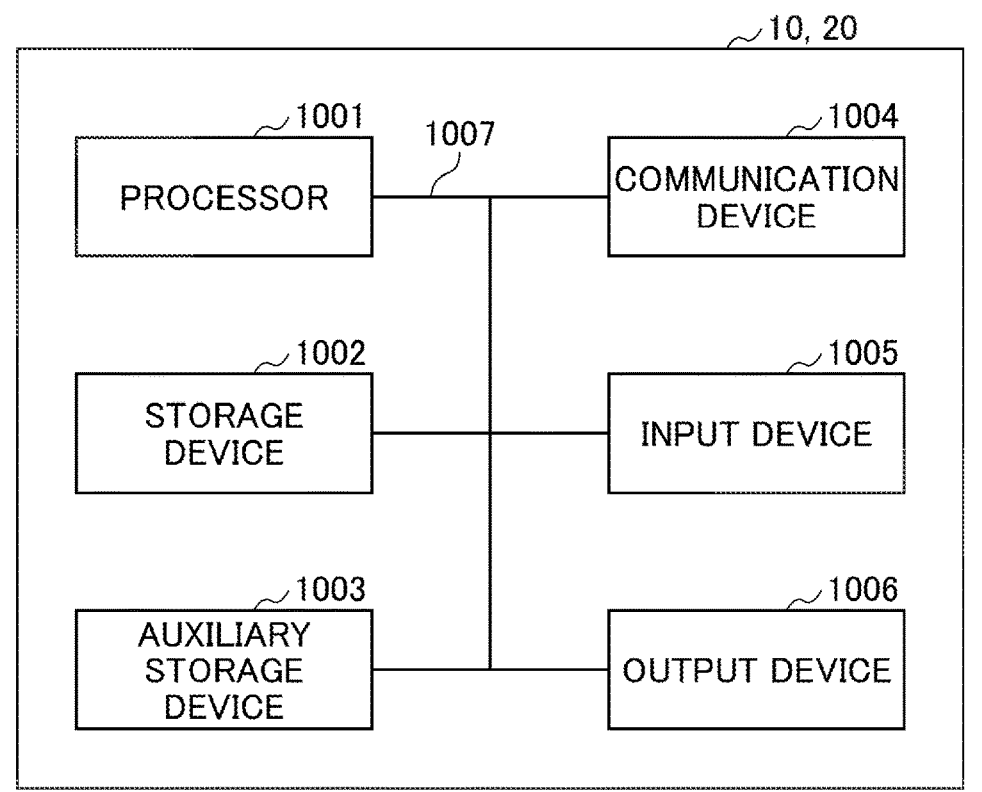
FIG. 12 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 12 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 10 may be realized by control programs that are stored in the storage device 1002 and are executed by the processor 1001.

Further, for example, the control unit 240 of the terminal 20 illustrated in FIG. 11 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive DCI (Downlink Control Information) including an index indicating a row in a TDRA (Time Domain Resource Allocation) table and an upper layer parameter from a 50 base station; a control unit configured to determine positions of one or a plurality of scheduled PUSCHs (Physical Uplink Shared Channel) in a time domain, based on the index and the upper layer parameter; and a transmission unit configured to transmit the one or the plurality of PUSCHs to the base station. In a case where the upper layer parameter is configured to be enabled and the index indicates scheduling of a single PUSCH in the TDRA, the control unit determines that the single PUSCH is to be repeatedly transmitted.

According to the above configuration, the base station 10 can efficiently schedule transmission of multiple PUSCHs and repeated transmissions of a single PUSCH for the terminal 20. In other words, scheduling of transmission of a plurality of channels and repeated transmissions of a single channel can be both performed in a wireless communication system.

In a case where the index indicates a number of repetitions of transmission in the TDRA, the control unit may determine that the single PUSCH is to be repeatedly transmitted for the number of repetitions. According to the configuration, the base station 10 can efficiently schedule transmission of multiple PUSCHs and repeated transmissions of a single PUSCH for the terminal 20.

The reception unit may receive another upper layer parameter from the base station, and in a case where the another upper layer parameter indicates a number of repetitions of transmission, the control unit may determine that the single PUSCH is to be repeatedly transmitted for the number of repetitions. According to the configuration, the base station 10 can efficiently schedule transmission of multiple PUSCHs and repeated transmissions of a single PUSCH for the terminal 20.

The index may indicate one of a first TDRA table or a second TDRA table, the first TDRA table may correspond to scheduling of the plurality of PUSCH transmissions, and the second TDRA table may correspond to scheduling of repeated transmissions of the single PUSCH. According to the configuration, the base station 10 can efficiently schedule transmission of multiple PUSCHs and repeated transmissions of a single PUSCH for the terminal 20.

The reception unit may receive first DCI or second DCI, and the control unit may determine whether scheduling is for transmission of the plurality of PUSCHs or for repeated transmissions of the single PUSCH, based on which of the first DCI or the second DCI is received. According to the configuration, the base station 10 can efficiently schedule transmission of multiple PUSCHs and repeated transmissions of a single PUSCH for the terminal 20.

As described above, according to an embodiment of the present invention, a communication method performed by a terminal is provided. The communication method includes: receiving DCI (Downlink Control Information) including an index indicating a row in a TDRA (Time Domain Resource Allocation) table and an upper layer parameter from a base station; determining positions of one or a plurality of PUSCHs (Physical Uplink Shared Channel) scheduled in a time domain, based on the index and the upper layer parameter; transmitting the one or the plurality of PUSCHs to the base station; in a case where the upper layer parameter is configured to be enabled and the index indicates scheduling of a single PUSCH in the TDRA, determining that the single PUSCH is to be repeatedly transmitted.

According to the above configuration, the base station 10 can efficiently schedule transmission of multiple PUSCHs and repeated transmissions of a single PUSCH for the terminal 20. That is, scheduling of transmission of multiple channels and repeated transmissions of a single channel can be both performed in a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and the base station subsystem that provide communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that Multi-PUSCH-And-Single-PUSCH-Repetition is an example of the upper layer parameter. pusch-AggregationFactor is an example of another upper layer parameter.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE
NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:
a reception unit configured to receive configuration information including a list of time resources (TDRA (Time Domain Resource Allocation)) used for transmission of an uplink data channel (PUSCH (Physical Uplink Shared Channel)) and downlink control information (DCI (Downlink Control Information)) including an index indicating at least one time resource included in the list;
a control unit configured to determine a resource allocation of the PUSCH in a time domain, based on the configuration information and the DCI; and
a transmission unit configured to transmit the PUSCH,
wherein the control unit does not apply repetition transmission to a plurality of PUSCHs in a case where the DCI schedules the plurality of PUSCHs.

2. The terminal as claimed in claim 1, wherein the control unit does not apply repetition transmission to the plurality of PUSCHs in a case where a plurality of SLIVs (Start and Length Indicator) are indicated by the index in the DCI.

3. A communication method performed by a terminal, the communication method comprising:
receiving configuration information including a list of time resources (TDRA (Time Domain Resource Allocation)) used for transmission of an uplink data channel (PUSCH (Physical Uplink Shared Channel)) and downlink control information (DCI (Downlink Control Information)) including an index indicating at least one time resource included in the list;
determining a resource allocation of the PUSCH in a time domain, based on the configuration information and the DCI;
not applying repetition transmission to a plurality of PUSCHs in a case where the DCI schedules the plurality of PUSCHs; and
transmitting the PUSCH.

4. A base station comprising:
a transmission unit configured to transmit configuration information including a list of time resources (TDRA (Time Domain Resource Allocation)) used for transmission of an uplink data channel (PUSCH (Physical Uplink Shared Channel)) and downlink control information (DCI (Downlink Control Information) including an index indicating at least one time resource included in the list;
a control unit configured to indicate a terminal to determine resource allocation of the PUSCH in a time domain based on the configuration information and the DCI; and
a reception unit configured to receive the PUSCH,
wherein the control unit expects that repetition transmission is to be not applied to a plurality of PUSCHs in a case where the DCI schedules the plurality of PUSCHs.

5. A wireless communication system comprising: a terminal; and a base station, wherein
the base station includes:
a transmission unit configured to transmit configuration information including a list of time resources (TDRA (Time Domain Resource Allocation)) used for transmission of an uplink data channel (PUSCH (Physical Uplink Shared Channel)) and downlink control information (DCI (Downlink Control Information) including an index indicating at least one time resource included in the list;
a control unit configured to indicate a terminal to determine resource allocation of the PUSCH in a time domain based on the configuration information and the DCI; and
a reception unit configured to receive the PUSCH, and
the terminal includes:
a reception unit configured to receive the configuration information and the DCI from the base station;
a control unit configured to determine resource allocation of the PUSCH in a time domain, based on the configuration information and the DCI; and
a transmission unit configured to transmit the PUSCH to the base station,
wherein the control unit does not apply repetition transmission to a plurality of PUSCHs in a case where the DCI schedules the plurality of PUSCHs.

* * * * *